US012393825B2

(12) United States Patent
Ravindran et al.

(10) Patent No.: US 12,393,825 B2
(45) Date of Patent: Aug. 19, 2025

(54) METHODS AND SYSTEMS FOR ANALYZING AND PREDICTING TRANSACTIONS

(71) Applicant: The Boston Consulting Group, Inc., Boston, MA (US)

(72) Inventors: Arun Karthik Ravindran, Somerville, MA (US); Vincent Francois Faber, Boston, MA (US); Jack Chua, Mercer Island, WA (US)

(73) Assignee: The Boston Consulting Group, Inc., Boston, MA (US)

( * ) Notice: Subject to any disclaimer, the term of this patent is extended or adjusted under 35 U.S.C. 154(b) by 319 days.

(21) Appl. No.: 17/370,392

(22) Filed: Jul. 8, 2021

(65) Prior Publication Data
US 2021/0334627 A1 Oct. 28, 2021

Related U.S. Application Data

(63) Continuation of application No. 15/972,755, filed on May 7, 2018, now Pat. No. 11,100,387, which is a continuation of application No. 15/481,094, filed on Apr. 6, 2017, now Pat. No. 10,002,322.

(51) Int. Cl.
| | |
|---|---|
| *G06N 3/04* | (2023.01) |
| *G06N 3/044* | (2023.01) |
| *G06N 3/084* | (2023.01) |
| *G06Q 10/04* | (2023.01) |
| *G06Q 30/02* | (2023.01) |
| *G06N 3/082* | (2023.01) |

(52) U.S. Cl.
CPC ............ *G06N 3/044* (2023.01); *G06N 3/084* (2013.01); *G06Q 10/04* (2013.01); *G06Q 30/02* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 10,002,322 B1 * | 6/2018 | Ravindran | ............ G06Q 30/02 |
| 11,100,387 B2 * | 8/2021 | Ravindran | ............ G06Q 10/04 |
| 2015/0332414 A1 | 11/2015 | Unser et al. | |
| 2017/0169475 A1 | 6/2017 | Korpusik et al. | |

OTHER PUBLICATIONS

Du et al., Recurrent Marked Temporal Point Processes: Embedding Event History to Vector; KDD '16, Aug. 13-17, 2016, San Francisco, CA, USA; pp. 1555-1564 (Year: 2016).*

Breuel, Benchmarking of LSTM Networks, arXiv:1508.02774v1 [cs.NE] Aug. 11, 2015; pp. 1-17 (Year: 2015).*

(Continued)

*Primary Examiner* — Alan Chen
(74) *Attorney, Agent, or Firm* — DLA Piper LLP (US)

(57) ABSTRACT

Methods and systems for predicting are disclosed. Records for transactions can be stored, each record comprising an indication identifying items involved in a transaction and an indication of a time elapsed between the transaction and a previous transaction. The records for transactions can be analyzed to produce a probability that the items will be involved in a next transaction.

15 Claims, 13 Drawing Sheets

(56) References Cited

OTHER PUBLICATIONS

Wikipedia-LSTM, https://en.wikipedia.org/wiki/Long_short-term_memory; printed on Jan. 25, 2024 (Year: 2024).*

Gers et al., Learning to Forget: Continual Prediction with LSTM, Neural Computation—Oct. 2000; Total pp. 20 (Year: 2000).*

Xiao et al., Joint Modeling of Event Sequence and Time Series with Attentional Twin Recurrent Neural Networks, arXiv:1703.08524v1 [cs. LG] Mar. 24, 2017; pp. 1-14 (Year: 2017).*

Gers et al., LSTM Recurrent Networks Learn Simple Context-Free and Context-Sensitive Languages, IEEE Transactions on Neural Networks, vol. 12, No. 6, Nov. 2001; pp. 1333-1340 (Year: 2001).*

Altman, Douglas, et al., "Diagnostics tests 1: sensitivity and specificity" BMJ, vol. 308, p. 1552 (Jun. 11, 1994).

Gers, Felix, et al., "Learning to Forget: Continual Prediction with LSTM" Technical Report IDSIA-01-99, 19 Pages, (Jan. 1999).

Gers, Felix, et al., "Learning Precise Timing with LSTM Recurrent Networks" Journal of Machine Learning Research, vol. 3, pp. 115-143, (Aug. 2002).

Greff, Klaus, et al., "LSTM: A Search Space Odyssey" printed from https://arxiv.org/abs/1503.04069,18 Pages, (Mar. 13, 2015).

Hochreiter, Sepp, et al., "Long Short-Term Memory", Neural Computation, vol. 9, Issue 8, pp. 1735-1780, (Nov. 15, 1997).

Hochreiter, Sepp, et al., "Gradient Flow in Recurrent Nets: the Difficulty of Learning Long-Term Dependencies", A Field Guide to Dynamical Recurrent Neural Networks, IEEE Press., 15 Pages, (2001).

Mozer, Michael, "A Focused Backpropagation Algorithm for Temporal Pattern Recognition", Complex Systems, vol. 3, pp. 349-381, (1989).

Rumelhart, David, et al., "Learning represenations by backpropagating errors", Nature, vol. 323, Issue 9, pp. 533-536, (Oct. 9, 1986).

Schmidhuber, Jurgen, "Why use recurrent networks at all? and why use a particular Deep Learning recurrent network called Long Short-Term Memory or LSTM?" printed from http://people.idsia.ch/~juergen/rnn.html, 10 Pages.(2015).

"Sensitivity and specificity" printed from https://en.wikipedia.org/wiki/Sensitivity_and_specificity, pp. 6, (Mar. 31, 2017).

Zhenzhou Wu, "Neural Modeling of Buying Behaviour for E-Commerce from Clicking Patterns", ACM RceSys '15 Challenge, pp. 4., (Sep. 2015).

Nan Du, "Recurrent Marked TEmporal Point Processes: Embedding Event History to Vector", ACM KDD '16, pp. 1555-1564, (Aug. 2016).

"Understanding LSTM Networks", printed from http://colah.github.io/posts/2015-08-Understanding-LSTMs/, 9 Pages, (Aug. 27, 2015).

Anand et al., "Deep Temporal Features to Predict Repeat Buyers", TCS Research, New Delhi, India, Conference Paper, 2015, pp. 1-6, (2015).

Nikulin, "On the Method for Data Streams Aggregation to Predict Shoppers Loyalty" IEEE, Total pp. 8, (2015).

Salehinejad et al., Customer Shopping Pattern Prediction: A Recurrent Neural Network Approach, IEEE, Total pp. 6, (2016).

Edward Choi, "Doctor AI: Predicting Clinical Events via Recurrent Neural Networks", pp. 19, (Nov. 18, 2015).

Tong Chen, "When Point Process Meets RNNs: Predicting Fine-Grained User Interests with Mutual Behavioral Infectivity", pp. 9, (Oct. 14, 2017).

How Jing, "Neural Survival Recommender", Web Search and Data Mining, pp. 10, (Feb. 2, 2017).

Yu Zhu, "What to do Next" Modeling User Behaviors by Time-LSTM, Proceedings of the Twenty-Sixth International Joint Conference on Artificial Intelligence, pp. 7, (Aug. 1, 2017).

Extended European Search Report issued in Application No. 18170934.6 dated Nov. 2, 2018.

Extended European Search Report issued in Application No. 18170934.6 dated Nov. 20, 2020.

Breuel T.M., "Benchmarking of LSTM Networks," arXiv:1508.02774v1, Aug. 11, 2015, pp. 1-17.

Du N., et al., "Recurrent Marked Temporal Point Processes: Embedding Event History to Vector," In Proceedings of the 22nd ACM SIGKDD International Conference on Knowledge Discovery and Data Mining, Aug. 2016, pp. 1555-1564.

Gers et al. "LSTM Recurrent Networks Learn Simple Context-Free and Context-Sensitive Languages" Nov. 2001, IEEE Transactions on Neural Networks, 12(6):1333-1340.

Gers F.A., et al., "Learning to Forget: Continual Prediction with LSTM," Neural Computation, Oct. 2000, 20 Pages.

Wikipedia, "Long Short-Term Memory," 2024, 15 pages, Retrieved from the internet: URL: https://en.wikipedia.org/wiki/Long_short-term_memory.

Xiao S., et al., "Joint Modeling of Event Sequence and Time Series with Attentional Twin Recurrent Neural Networks," arXiv: 1703.08524v1, Mar. 24, 2017, pp. 1-14.

\* cited by examiner

Fig. 5
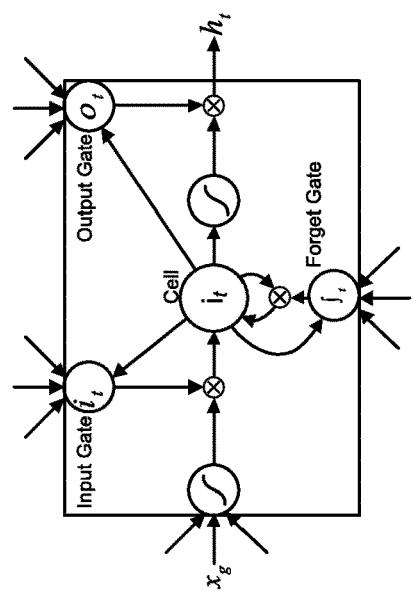
504
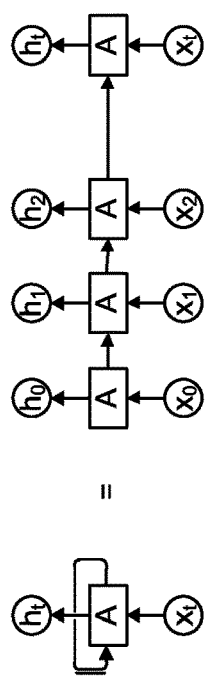
502

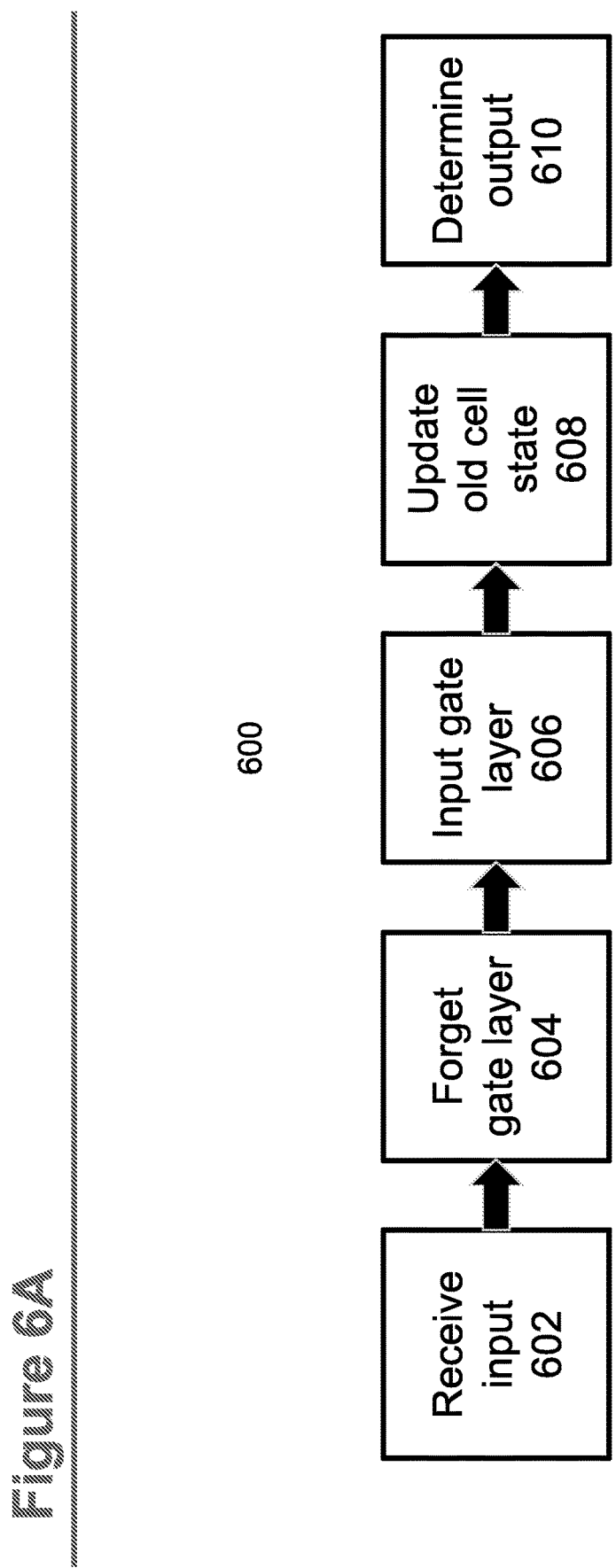

METHODS AND SYSTEMS FOR ANALYZING AND PREDICTING TRANSACTIONS

CROSS-REFERENCE TO RELATED APPLICATIONS

This application is a continuation of U.S. application Ser. No. 15/972,755 filed May 7, 2018, and U.S. application Ser. No. 15/481,094, filed Apr. 6, 2017 (now U.S. Pat. No. 10,002,322), the disclosures of which are incorporated by reference in their entirety.

BRIEF DESCRIPTION OF THE DRAWINGS

FIG. 5 shows a recurrent neural network and long short term memory network according to an embodiment of the invention.

FIG. 6A-6E show a long short term memory network process according to an embodiment of the invention.

DETAILED DESCRIPTION OF SEVERAL EMBODIMENTS

Figure 1:
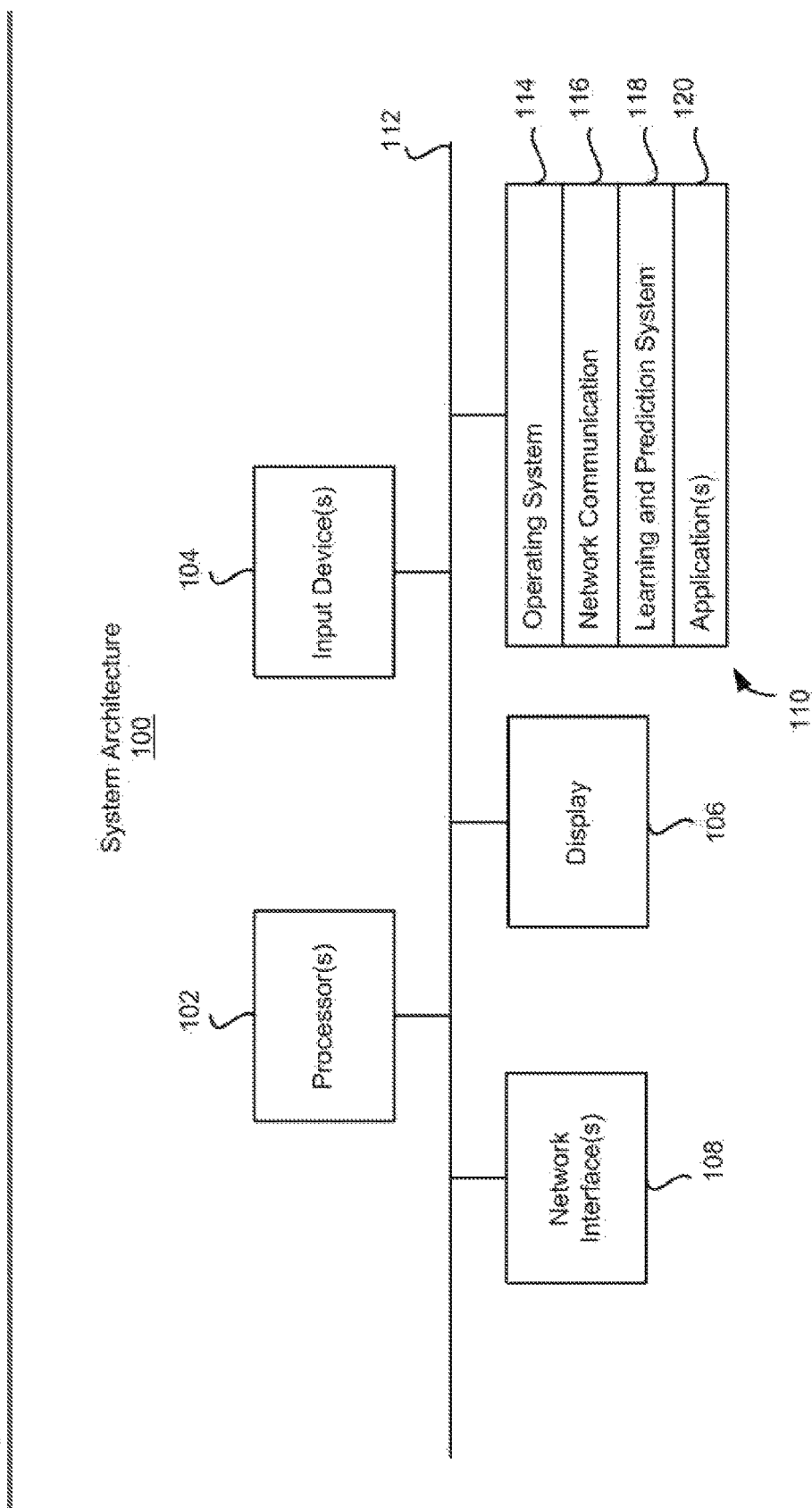
FIG. 1 is a learning and prediction system according to an embodiment of the invention.

Systems and methods described herein may utilize deep learning techniques to predict future transactions. Deep learning (which can also be called deep structured learning, hierarchical learning or deep machine learning) comprises a class of machine learning algorithms that: can use a cascade of many layers of nonlinear processing units for feature extraction and transformation (e.g., each successive layer uses the output from the previous layer as input); can be based on the (unsupervised) learning of multiple levels of features or representations of the data (e.g., higher level features are derived from lower level features to form a hierarchical representation); can be part of the broader machine learning field of learning representations of data; and can learn multiple levels of representations that correspond to different levels of abstraction where the levels form a hierarchy of concepts. There are several algorithms in this family: recurrent neural networks, restricted Boltzman machines, convolutional neural networks etc. Typically, deep learning is used for computer vision and natural language processing application. In one embodiment, deep learning is utilized in a business application. For example, given a series of past transactions made by a customer, a deep learning model may be used to predict what the next transaction will be and when it will occur. Predictions may be based on a publicly available data set (e.g., a transaction record) in some embodiments, aggregating hundreds of millions of customer transactions. Examples described herein use point of sale data, but the deep learning and prediction techniques may be applied to other data types. Each transaction may include a customer ID, a time stamp, and/or a precise description of the items purchased (e.g., department, product, quantity, price, etc.). A long short term memory (LSTM) network may use this data to predict what and when the next transaction will be. A LSTM network comprises a recurrent neural network (RNN) architecture. A LSTM network can be universal in the sense that given enough network units it can compute anything a conventional computer can compute, provided it has the proper weight matrix, which may be viewed as its program. A LSTM network may be well-suited to learn from experience to classify, process and predict time series when there are varying time lags. With training, the LSTM network may output accurate predictions, such as, for example, regarding what/when a next transaction will be. In some example embodiments, prediction accuracy may be as follows:

Predictions may be at least 10× better than chance.

More than 50% of the items that are actually purchased during the next transaction may be predicted (this may be referred to as sensitivity).

More than 50% of the predicted items may actually be purchased during the next transaction.

More than 95% of the items that are not in the predicted basket may actually be not purchased (this may be referred to as specificity and/or a true negative rate).

The predicted time until next transaction may be as close as a few hours to the actual purchase time.

The systems and methods described herein may have a diverse range of applications, as they provide enhanced customer behavior prediction at a micro level and can therefore help optimize targeted marketing, dynamic pricing, inventory management, etc. for retailers which includes, but is not limited to: grocery chains, clothing chains, fast food chains, etc. With information on when the customers are going to come back and what they are going to buy, retailers can enhance their marketing strategies and promotional offers to increase sales. Knowing demand for particular item(s) will peak on a specific day allows the retailers to plan for the supply, optimize inventory and strategize pricing.

FIG. 1 is a block diagram of an example learning and prediction system architecture 100 that may implement the features and processes described herein. The architecture 100 may be implemented on any electronic device that runs software applications derived from compiled instructions, including without limitation personal computers, servers, smart phones, media players, electronic tablets, game consoles, email devices, etc. In some implementations, the architecture 100 may include one or more processors 102, one or more input devices 104, one or more display devices 106, one or more network interfaces 108, and one or more computer-readable mediums 110. Each of these components may be coupled by bus 112.

Display device 106 may be any known display technology, including but not limited to display devices using Liquid Crystal Display (LCD) or Light Emitting Diode (LED) technology. Processor(s) 102 may use any known processor technology, including but not limited to graphics processors and multi-core processors. Input device 104 may be any known input device technology, including but not limited to a keyboard (including a virtual keyboard), mouse, track ball, and touch-sensitive pad or display. Bus 112 may be any known internal or external bus technology, including but not limited to ISA, EISA, PCI, PCI Express, NuBus, USB, Serial ATA or FireWire. Computer-readable medium 110 may be any medium that participates in providing instructions to processor(s) 102 for execution, including without limitation, non-volatile storage media (e.g., optical disks, magnetic disks, flash drives, etc.), or volatile media (e.g., SDRAM, ROM, etc.).

Computer-readable medium 110 may include various instructions for implementing an operating system 114 (e.g., Mac OS®, Windows®, Linux). The operating system may be multi-user, multiprocessing, multitasking, multithreading, real-time, and the like. The operating system 114 may perform basic tasks, including but not limited to: recognizing input from input device 104; sending output to display device 106; keeping track of files and directories on computer-readable medium 110; controlling peripheral devices (e.g., disk drives, printers, etc.) which can be controlled directly or through an I/O controller; and managing traffic on bus 112. Network communications 116 may use instructions to establish and maintain network connections (e.g., software for implementing communication protocols, such as TCP/IP, HTTP, Ethernet, etc.).

A learning and prediction system 118 can include instructions that may perform deep learning and/or LSTM network processing as described in detail below. For example, the learning and prediction system 118 may analyze transactions and make future transaction predictions.

Application(s) 120 may be one or more applications that use or implement the processes described below. The processes may also be implemented in operating system 114.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Python, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Learning and prediction system 118 may utilize one or more deep learning models. Deep learning models are advanced machine learning algorithms based on computational models of the brain. Deep learning models may include neural networks. Neural networks may be trained using past data to predict future events. Research by JUrgen Schmidhuber and his team has shown how LSTM can learn to remember the important things and forget the less important ones, in the context of brain modeling and language learning. LSTMs are helpful in natural language generation for this reason, since they remember the context and use it to predict what the next word (or sentence, etc.) should be.

For additional information on LSTMs, the following references, which are herein incorporated by reference in their entirety, may be consulted: "Learning Precise Timing with LSTM Recurrent Networks" by F. A. Gers et al. in Journal of Machine Learning Research, Vol. 3, Pgs. 115-143 (August 2002); "Learning to Forget: Continued Prediction with LSTM" by F. A. Gers et al. in Neural Computation, Vol. 12, Is. 10, Pgs. 2451-2471 (2000 October); and "Long Short-Term Memory" by S. Hochreiter et al., in Neural Computation, Vol. 9, Is. 8, Pgs. 1735-1780 (1997 Nov. 15).

Figure 2:
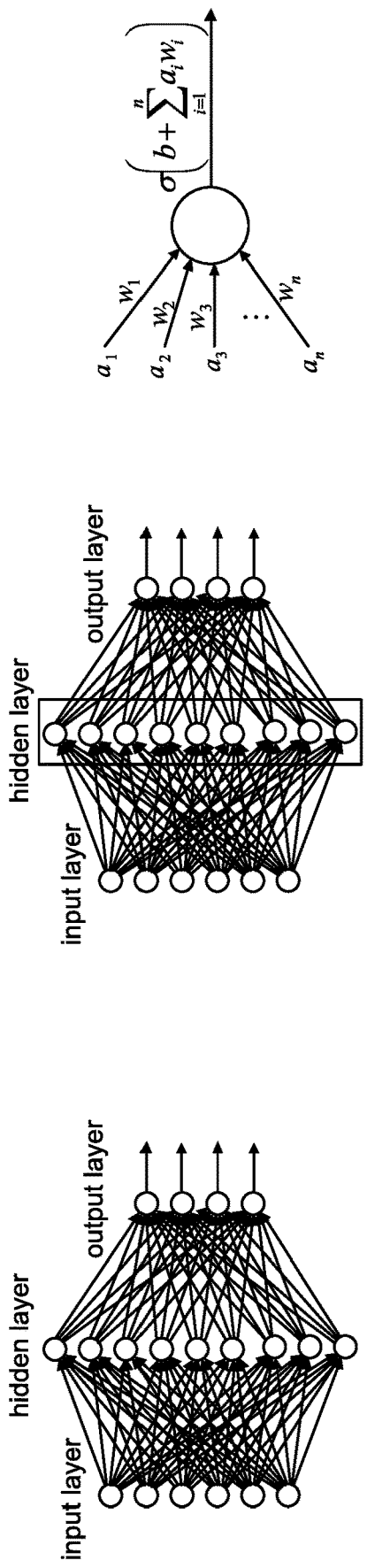
FIG. 2 is a neural network overview according to an embodiment of the invention.

FIG. 2 is a neural network overview according to an embodiment of the invention. A neural network 202 may be composed of a plurality of layers. For example, neural network 202 includes an input layer, a hidden layer, and an output layer. The point-wise non linearity of each layer may vary depending on the type of layer. Each layer may be composed of a plurality of nodes, which are also referred to as neurons. Nodes from a given layer may be connected to some or all of the nodes in the next layer, and each of these connections may be characterized by a weight. Each node/neuron in one layer may be fully connected to all the nodes above and below this layer. As these nodes learn specific relationships among the input patterns, their weights may be strengthened. A particular input pattern could increase the weights and/or connection strength between several nodes and decrease the weights elsewhere. This may be akin to how the neurons in the brain learn to fire together—by forming strong relationships. Each node may process the information passed along by all the nodes from the previous layers. For example, in 206, a node may receive data $a_1$-$a_n$ from the n nodes of the previous layer, and may process the data according to a specified algorithm involving the weights w of the connections. Diagram 204 is the same neural network diagram of 202, but highlights the hidden layers. Several such hidden layers can be added in an LSTM to learn association between transactions. 206 illustrates how the different weights can lead to an activation of the node/neuron. 208 describes a cost function algorithm showing how the weights can be learned when the prediction error is propagated back by a backpropagation algorithm, such as one of the examples shown in 210. Neural network 202 may have a cost function 208. For example, the cost function may be the cross entropy between the target values and the output of the network obtained by feeding a given input vector. The discrepancy and/or error between output and target may be back propagated through the neural network 202 (e.g., using one or more of the back propagation equations 210), which may cause the network weights to be optimized. By feeding multiple data points into the neural network 202 (e.g., batches of data), the weights may be optimized, and the error may decrease. Accordingly, neural network 202 may be trained.

Figure 3:
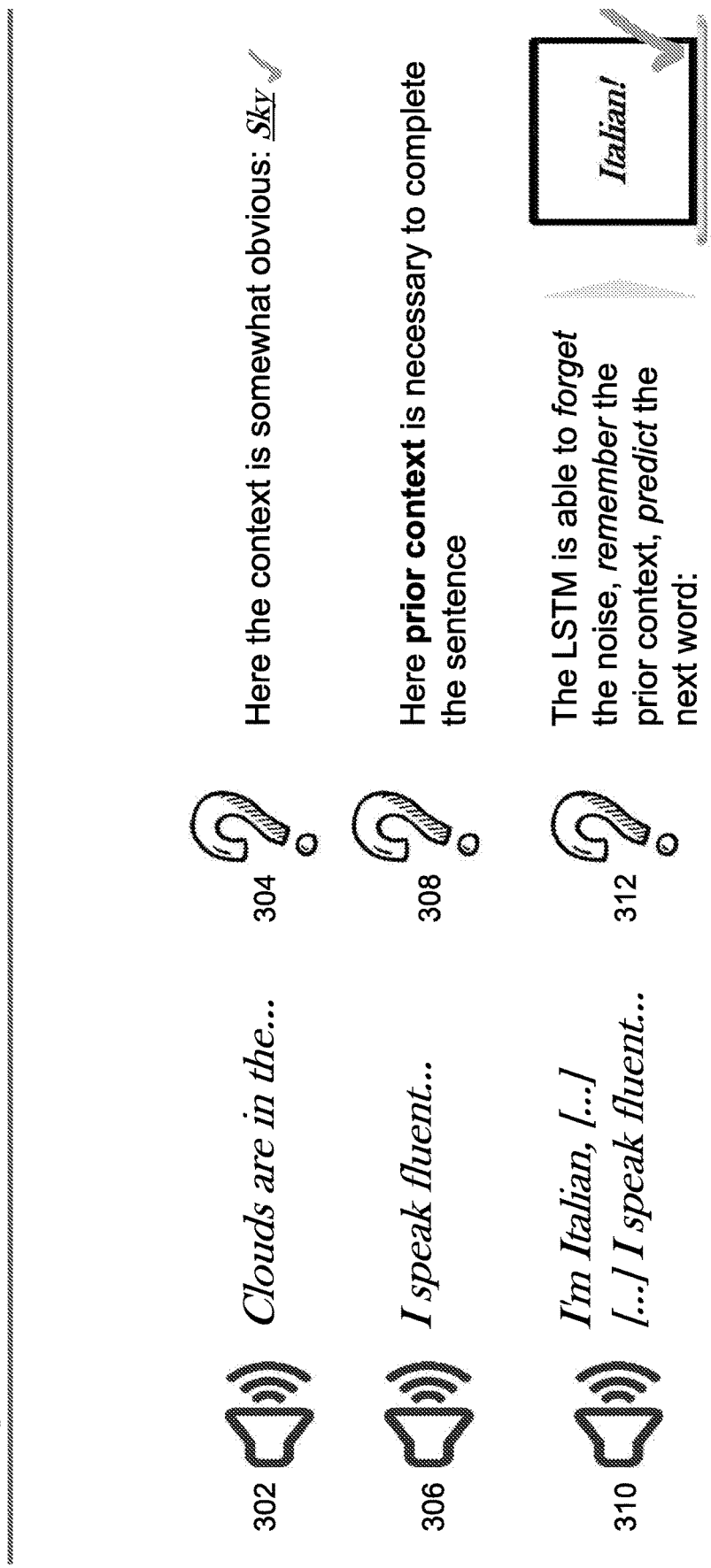
FIG. 3 is a long short term memory input/output example according to an embodiment of the invention.

Additional information on the back-propagation equations and algorithm can be found in the article "Learning Representations by Back-Propagation" by D. E. Rumelhart et al. in Nature, Vol. 323, Pgs. 533-536 (1986), which is incorporated by reference in its entirety:

FIG. 3 is a LSTM input/output example according to an embodiment of the invention. LSTM was born in the context of language processing, providing the ability to understand language and context and coherently complete a sentence. From a "learning" perspective, one strength of the LSTM is in its ability to process and predict time series when connected events happen with varied degrees of time lags. LSTM may allow a processor to select what to remember and what to forget. In the example of FIG. 3, the left column includes beginnings of statements, and the right column represents attempts to complete the statements. Statement 302 may have a relatively obvious context and may be easily completed in 304 (e.g., "clouds are in the sky"). However, statement 306 may require additional context to complete in 308 (e.g., "I speak fluent . . . " may be completed by any language). Given prior context, as in statement 310, a processor using LSTM may be able to complete an otherwise ambiguous statement in 312 (e.g., given the "I'm Italian" context, "I speak fluent . . . " may be completed with "Italian"). LSTM may be used to interpret context and determine what is important and what is not, and use the important context to make future predictions (e.g., predictions about the end of a statement in the example of FIG. 3).

Figure 4:
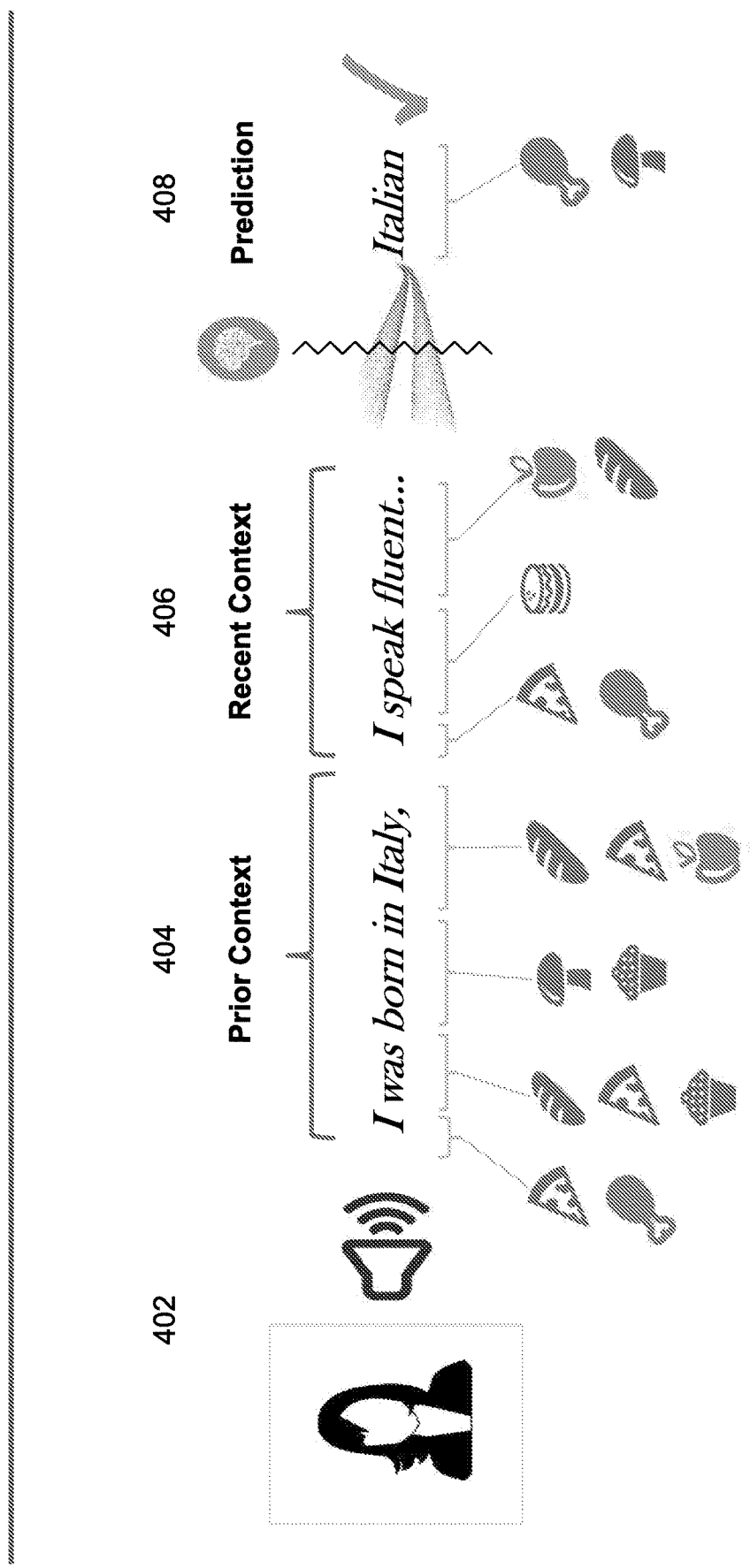
FIG. 4 is a long short term memory processing example according to an embodiment of the invention.

FIG. 4 is a LSTM processing example according to an embodiment of the invention. In 402, an LSTM system may receive input (e.g., spoken audio). In this example, the user says "I was born in Italy, I speak fluent . . . " The user's statement contains two clauses, an earlier first clause ("I was born in Italy") and a later second clause ("I speak fluent . . . "). Each clause contains a plurality of words. Each clause corresponds to a context, the first clause to a prior context 404 and the second clause to a recent context 406 occurring later in time than the prior context 404. The LSTM system may use words from the prior context 404 and the recent context 406 to predict the next word (e.g., prediction 408 "Italian").

The example of FIG. 4 uses linguistic contexts to predict future words, but the same LSTM concepts may be applied to other types of predictions. For example, as described below, LSTM may be used to make predictions about future transactions. In one example, records of a person's past purchases may be input and analyzed, and predictions about future user purchases (e.g., what will be purchased and when) may be output. Relative to the example of FIG. 4, words may correspond to single transactions, and sentences may correspond to a series of transactions. Instead of predicting the next word, systems and methods described herein may predict the next transaction.

FIG. 5 shows a comparison between an example of recurrent neural network 502 and LSTM network 504 according to an embodiment of the invention. The comparison illustrates how the respective networks may process time series data to learn patterns and modify their predictions based on past outputs. In the LSTM example model, time can be implicitly modeled, the model can learn the temporal sequence information (e.g., such as by learning a musical composition) and can use it to predict the next note, when presented with the first few notes of the composition. This may be different from classical neural network models where each input may be associated with an output, and the inputs may be considered independent (e.g., even if they are in a sequence). In other words, the classical neural network model can learn the association between one note and the following note—but this learning may be completely devoid of the context and rhythm. Recurrent neural network 502 may include loops, allowing the output of the n-th iteration to be fed back to the network of the (n+1)th iteration (e.g., along with the new input vector). Accordingly, recurrent neural network 502 may try to learn everything but may "remember" only important events, akin to humans, who can remember the musical note sequences for some compositions (e.g., such as those heard often or liked) and forget the musical note sequences for others LSTM can remember important, frequent and/or relevant sequences and forget the unimportant, rare and/or less relevant ones. LSTM network 504 may be an advanced version of recurrent neural network 502. RNNs aim to learn and memorize all input sequences, whereas LSTM aims to learn relevant significant sequence patterns and forget the less relevant ones. LSTM network 504 may predict and forecast next "entity" based on previous outputs. In doing so, LSTM network 504 may adapt its "way of thinking." To extend the musical sequence analogy, each transaction can be treated like a musical note. The input variables can be the encoded transaction or musical note, and weights in the model can be updated based on the presented input sequence.

In embodiments of the invention, the modeling done in LSTM network 504 may comprise the following variables: $x_t$: The input vector at the t-th iteration. This vector can be an encoded representation of a series of transactions. An example of an algorithm by which $x_t$ is generated is detailed in FIG. 8. More precisely, $x_t$ can take the form of the sequence of vectors in sub FIG. 808.

$h_{t-1}$: The output vector from the previous iteration, (t−1)-th. In other words, $h_{t-1}$ can be the vector outputted by the network at the previous iteration; it can take the form of the vector in sub FIG. 812.

σ: The sigmoid non-linear function.

tan h: The tan h non-linear function.

$W_f$, $W_i$, $W_o$, $W_c$: Weight matrices, whose entries can be randomly initialized and can be optimized during the training phase (e.g., via one or more backpropagation algorithms).

$b_f$, $b_i$, $b_o$, $b_c$: Bias vectors, whose entries can be randomly initialized and can be optimized during the training phase (e.g., via one or more backpropagation algorithms).

$f_t$: A vector, defined as $f_t = \sigma(W_f \cdot [h_{t-1}, x_t] + b_f)$.

Figure 6B:
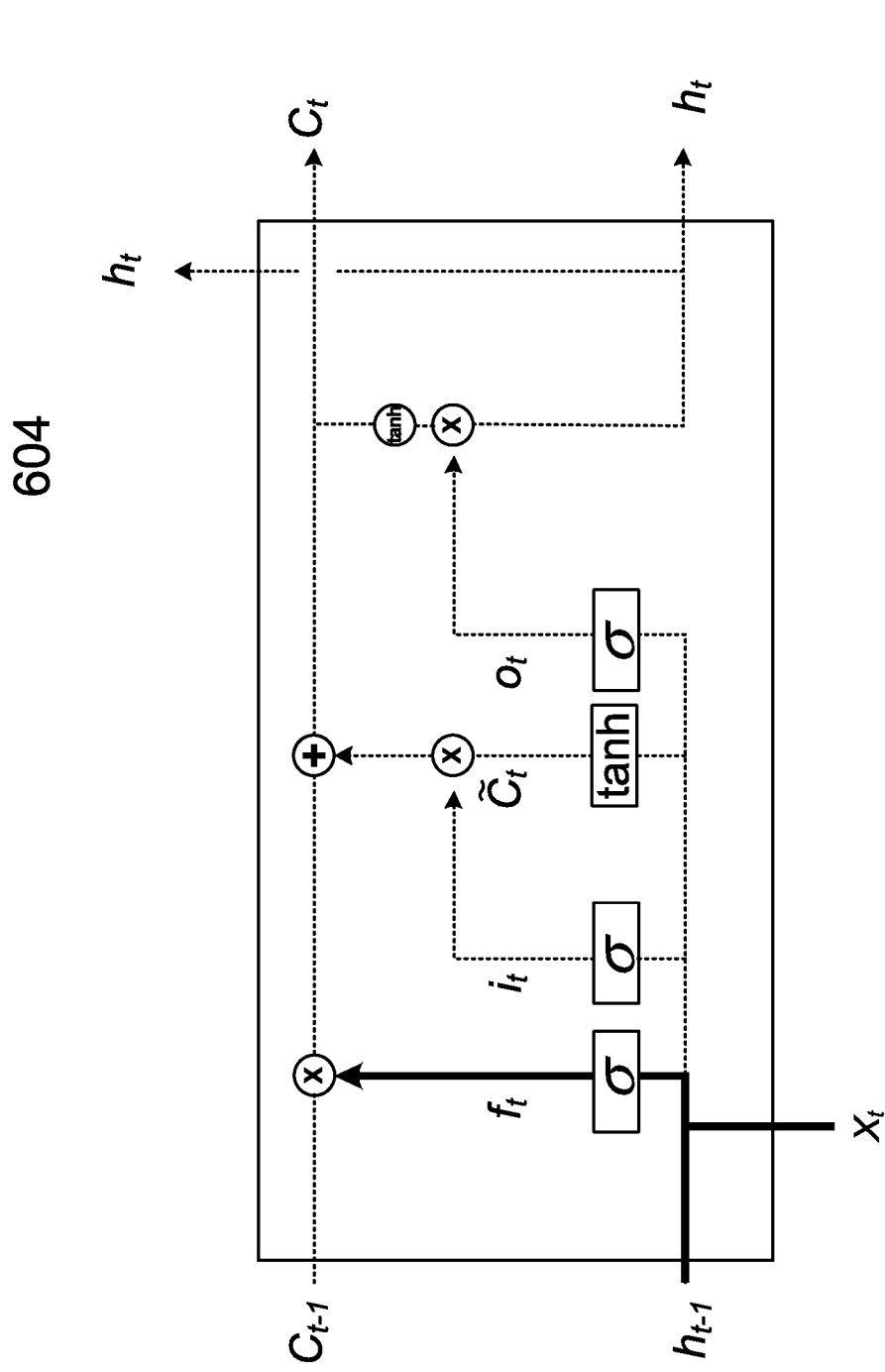

$i_t$: A vector, defined as $i_t = [h_{t-1}, x_t] + b_i)$ $\tilde{C}_t$: A vector, defined as $\tilde{C}_t = \tanh(W_C \cdot [h_{t-1}, x_t] + b_C)$ $C_t$: The state vector, defined as $C_t = f_t * C_{t-1} + i_t * \tilde{C}_t$ $o_t$: A vector, defined as $o_t = \sigma(W_o \cdot [h_{t-1}, x_t] + b_o)$ $h_t$: The output vector (see above), defined as $h_t = o_t * \tanh(C_t)$ FIG. 6A-6E show a LSTM network process 600 according to an embodiment of the invention. Specifically, FIG. 6A shows process 600, and FIGS. 6B-6E show detailed views of steps 604-610, respectively. LSTM network process 600 may be performed by LSTM network 504 operated by system 100, for example.

In 602, system 100 may receive input to be evaluated. In 604, system 100 may apply a forget gate layer. The forget gate layer may decide what information to throw away from the input data, which may also be referred to as the cell state. For example, as shown in FIG. 6B, both the previous output (e.g., outcome of past iteration(s) of process 600 at step 610) and the new input may be passed through a sigmoid hidden layer. As set forth in the variable definitions above, both the previous output $h_t$, and the new input $x_t$, can be multi-dimensional vectors. The term "passed through a sigmoid hidden layer" can mean that the above vectors are sent through a regular dense neural network layer. In other words, each neuron in the hidden layer can compute the weighted sum of the input's entries (e.g., weighted by the relevant parameter, here $W_f$), and add a bias value to it (e.g., here $b_f$). The resulting scalar can then pass through a specific non-linear function named sigmoid, σ. The output of such process can then be set to the next step by the neuron.

Figure 6C:
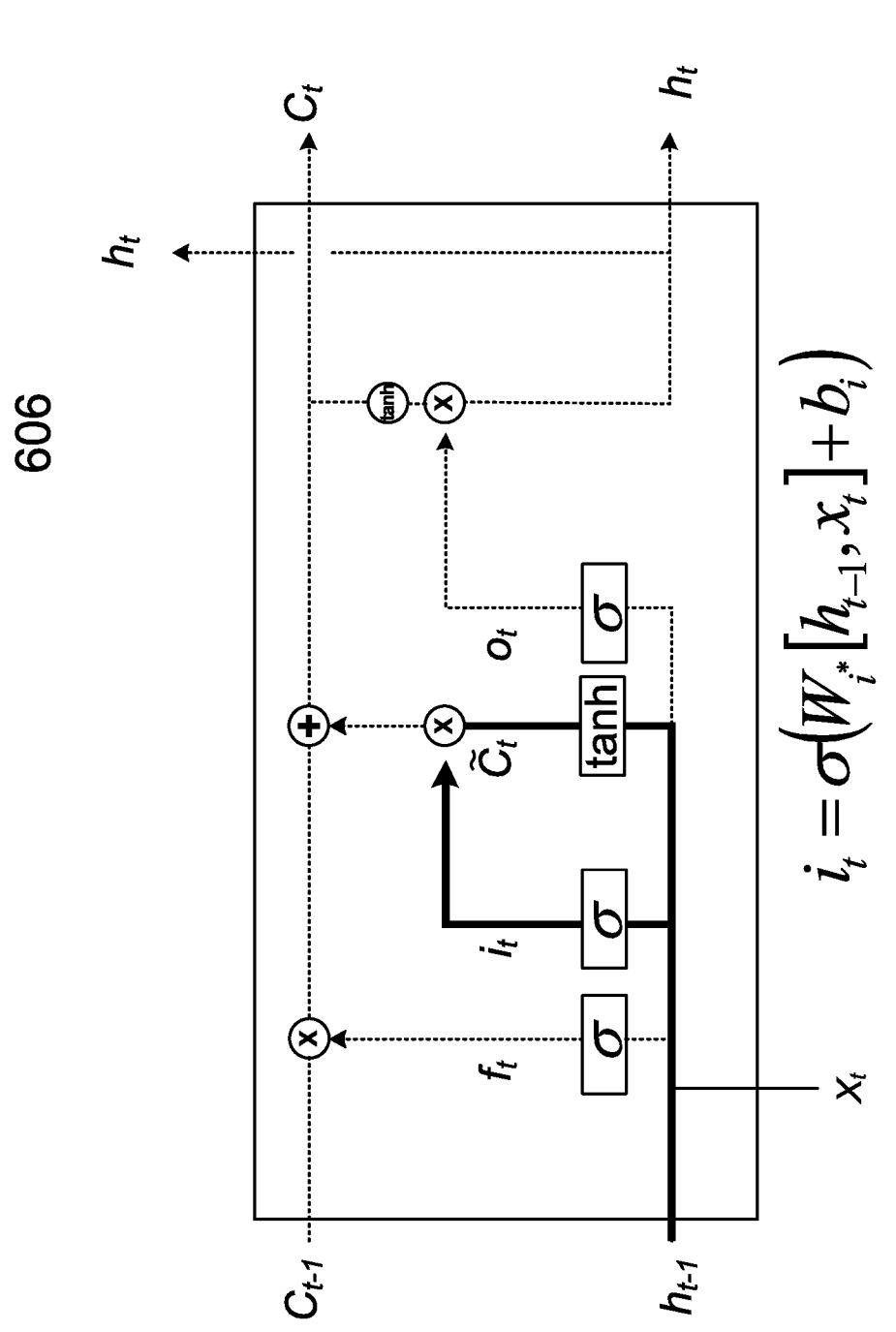

In 606, system 100 may apply an input gate layer. The input gate layer may decide what new information to store in the cell state. For example, as shown in FIG. 6C, this step may have two parts. The previous output $h_{t-1}$, and the new input $x_t$, (see VARIABLE DEFINITIONS for more details) may be passed through a sigmoid hidden layer, and separately in some embodiments, the previous output and the new input may be passed through a tan h hidden layer, following the same mechanics previously described. Those two distinct layers may only differs from one another in terms of the type of non-linear function that is applied to the output of the individual computation of each neuron (e.g., one is a sigmoid σ, the other is tan h).

Figure 6D:
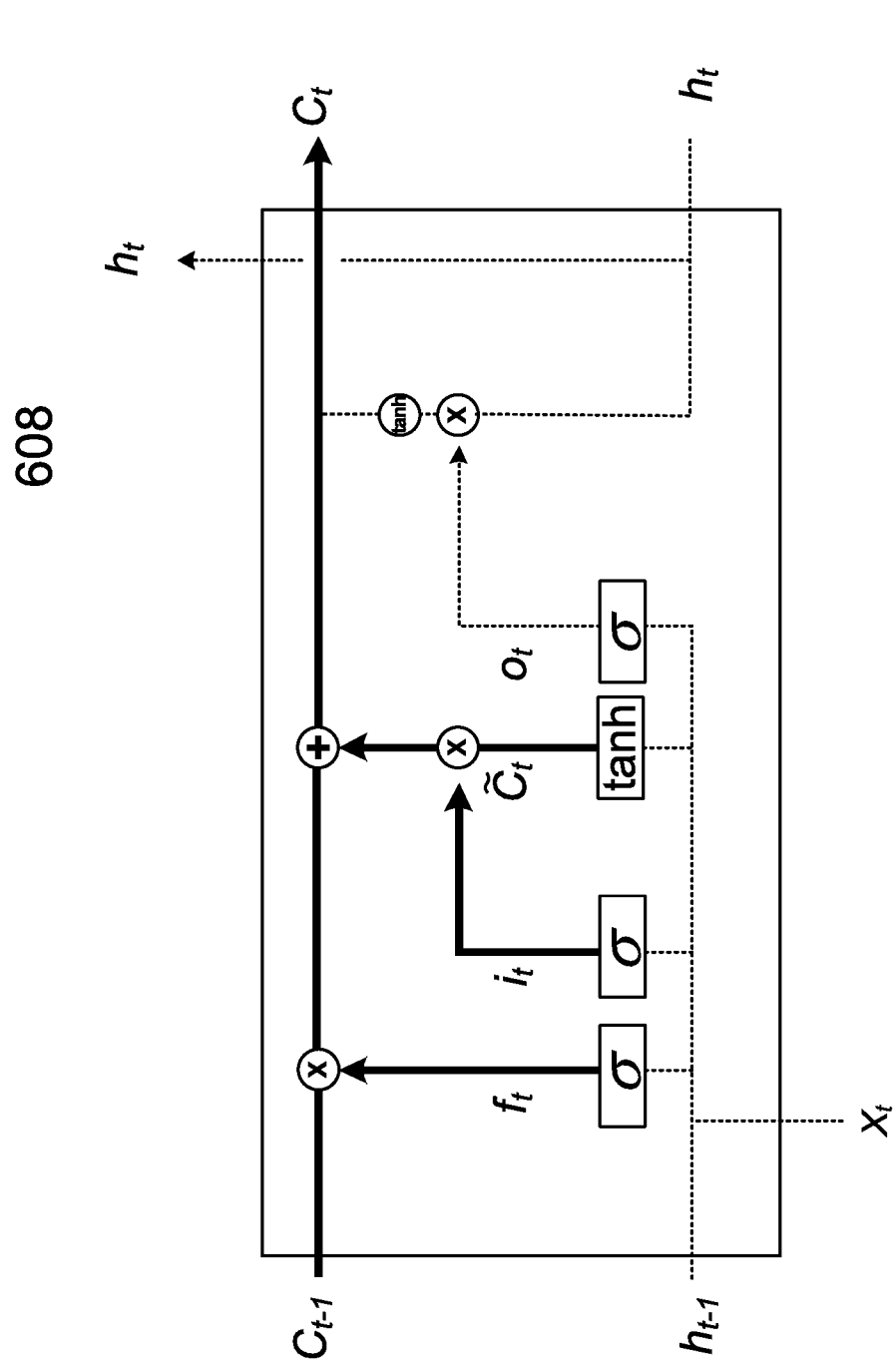

In 608, system 100 may update an old cell state. For example, as shown in FIG. 6D, cell state may be updated via 3 distinct element wise operations between the 3 previously outputted vectors and the current state of the nets. More concretely, the output of 604 can be point-wise multiplied with the old state vector $C_{t-1}$. Then, both outputs from 606 can be point-wise multiplied with each other. The output vector can then point-wise added to the updated state vector.

Figure 6E:
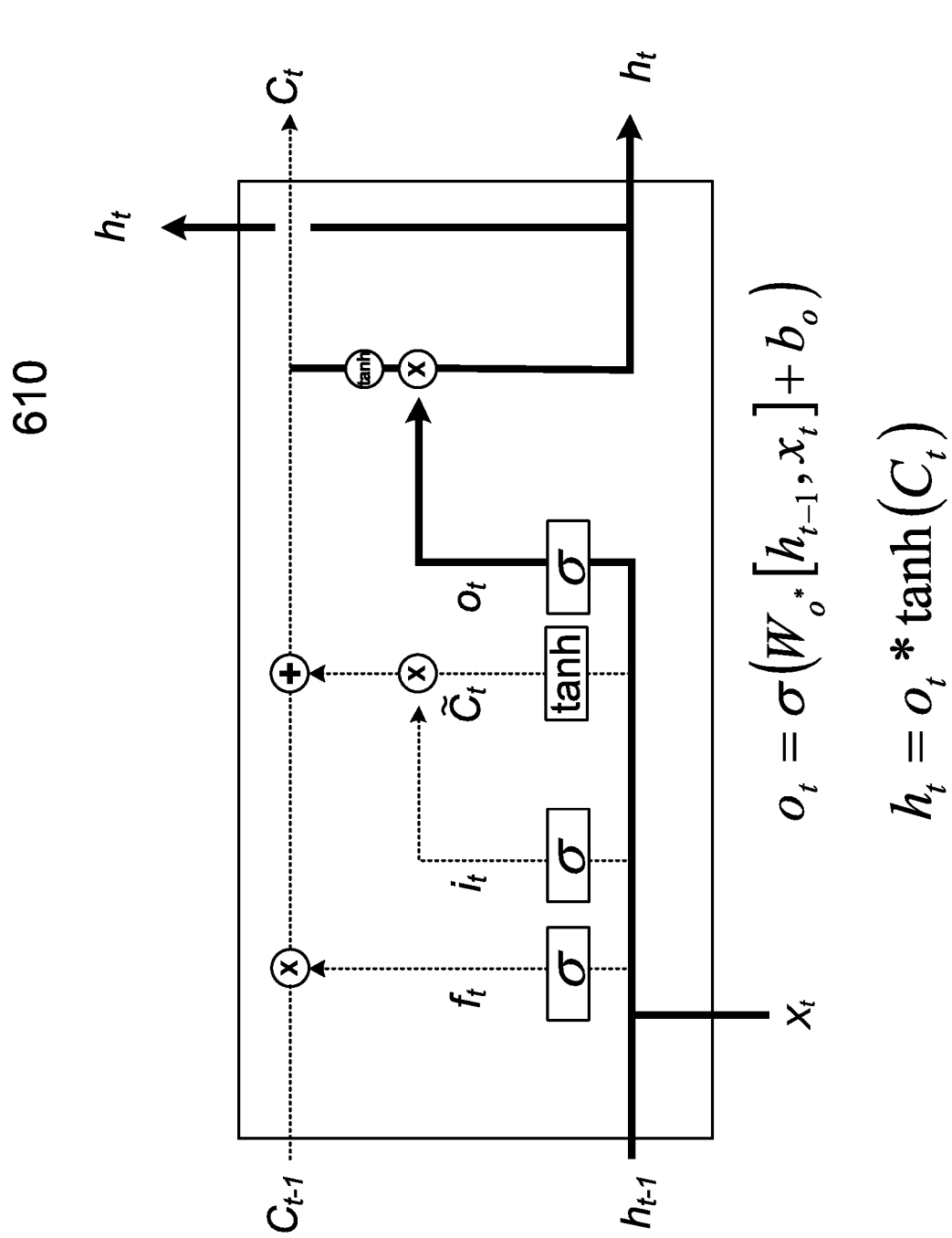

In 610, system 100 may decide what to output. For example, as shown in FIG. 6E, the decision may be based on the updated cell state, the previous output, and the current input. Both the previous output and the new input may be passed through a sigmoid hidden layer. The results may be point-wise multiplied with the updated cell state vector $C_t$, which previously was passed through a tam, non-linearity. System 100 may output the resulting vector $h_t$. (See VARIABLE DEFINITIONS for more details).

Figure 7:
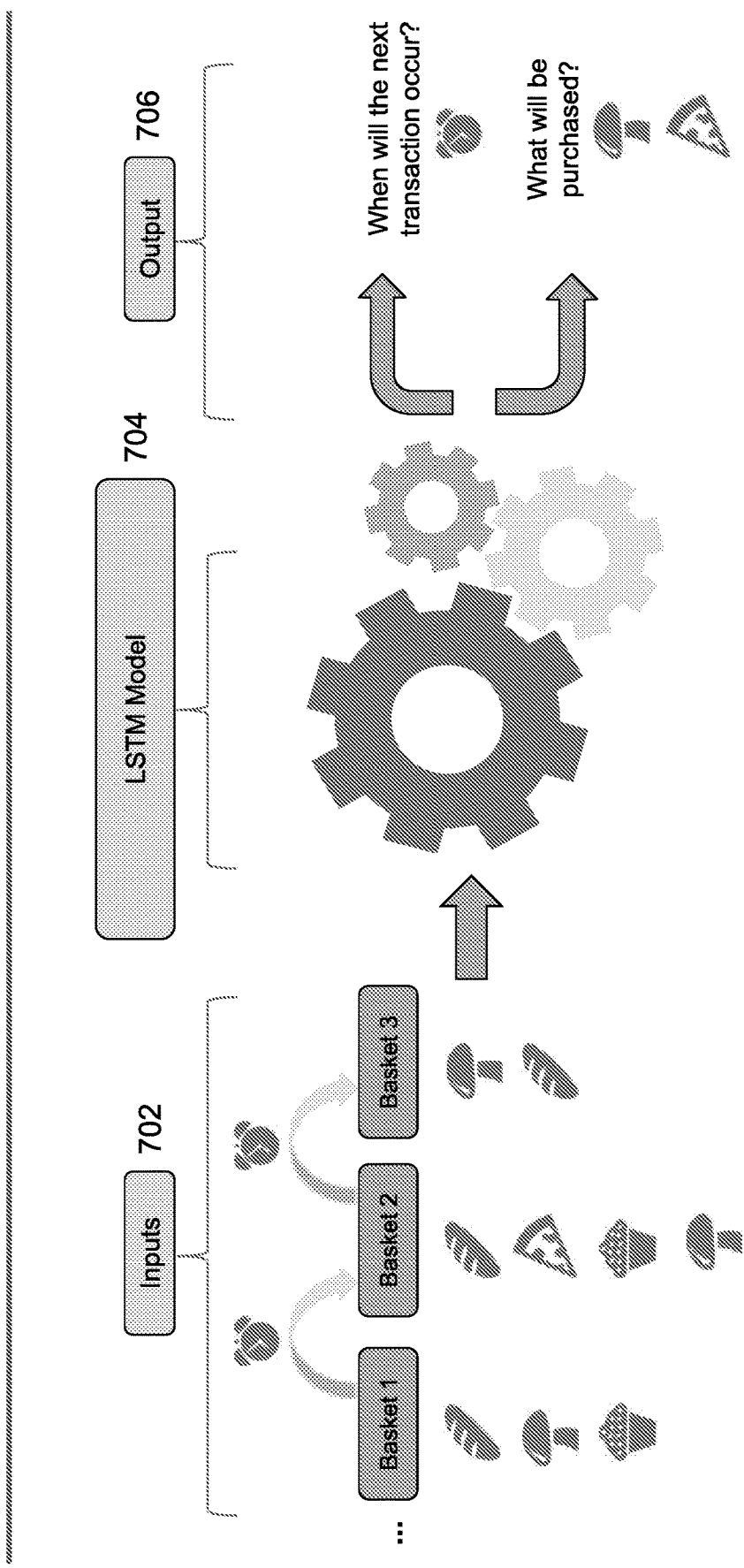
FIG. 7 is a learning and prediction overview according to an embodiment of the invention.

FIG. 7 is a learning and prediction overview, wherein transactions may be used to train a predictive model, according to an embodiment of the invention. In this example, the inputs 702 include records of transactions (e.g., user purchases, including what was purchased, when, where, at what price, and/or other information). Inputs 702 (transactions) may be represented as separate transaction baskets, where each transaction basket may include one or more purchased items. System 100 may encode transaction baskets into binary vectors according to the mapping described in 804 of FIG. 8. For example, if there are a total of 2 items A and B, then a transaction consisting of B only, will be encoded as (0,1). System 100 may also encode time since last transaction. For example, in the example above, if the time since the previous transaction was 24 hours, the final encoded transaction vector will be (0,1,24).

System 100 may feed encoded transactions to LSTM model 704. Within model 704, a data point may comprise a series of sequential transactions, not a single unique transaction. LSTM model 704 may extract information from the sequence of transactions. LSTM model 704 may also extract information from the time between transactions.

System 100 may produce output 706. Output 706 may include predictions regarding when a next transaction is likely and what items are likely to be purchased next.

Figure 8:
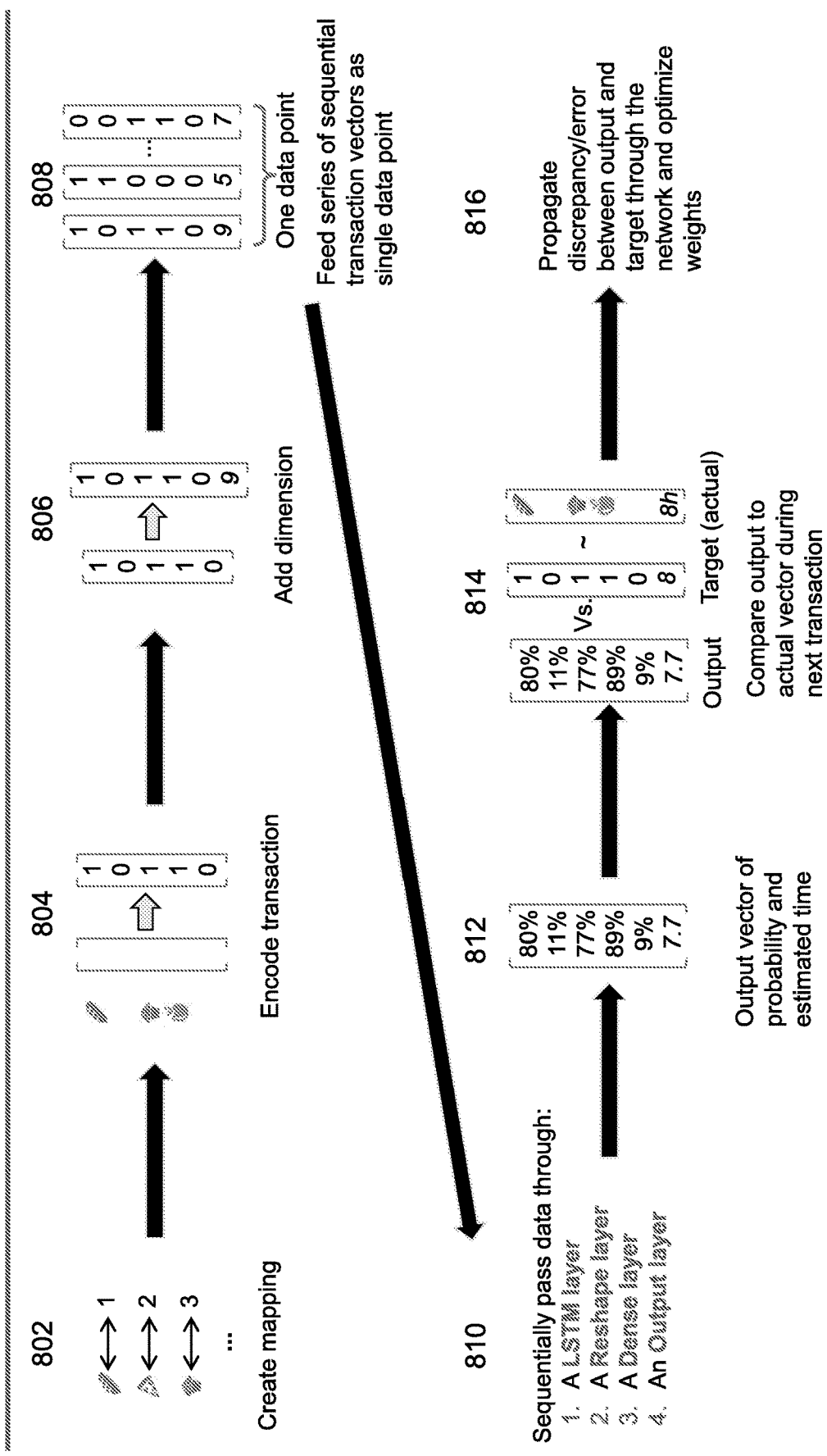
FIG. 8 is a learning and prediction process according to an embodiment of the invention.

FIG. 8 is a learning and prediction process according to an embodiment of the invention. This process may be a specific implementation of the general learning and prediction procedure illustrated in FIG. 7. As in FIG. 7, the process of FIG. 8 may use a series of sequential transaction made by a given customer as input(s). Each transaction may include a set of purchased items and a time stamp. For example, the data set may be a sequence of transactions, such that for each transaction, the items purchased are specified, as well as the time when the transaction took place.

Given an input transaction, in 802, system 100 may create a mapping such that each item gets assigned a unique index. For example, if there are a total of 2 items, A and B, then item A may be assigned index 0, and item B may be assigned index 1. In 804, system 100 may encode the transaction to represent each mapped item within the transaction. For example, in the example above, a transaction consisting only of item A will be mapped to the vector (1,0). In 806, system 100 may add a dimension to the encoded transaction to indicate the time since the last transaction. For example in the example above, if the time since the previous transaction was 48 hours, the final encoded transaction vector will be (1,0,48). These steps may be repeated for multiple input transactions.

In 808, system 100 may feed a series of sequential transactions vectors encoded as described above as a single data point to the LSTM network. For example, within the frame of the above example, such vector sequence could be (0,1), (1,1), (0,1), (1,0) In the embodiment in 810, system 100 may sequentially pass the data point through: an input layer, an LSTM layer, a reshape layer, a dense layer, a reshape layer, and an output layer. (Note that in other embodiments the number of a certain type of layer can vary and/or the order of how the data is passed through the layers can vary.) An LSTM layer can process the data as described in FIG. 6. A reshape layer can allow an LSTM's output to be reshaped into a different multi-dimensional vector. A dense layer may be a simple fully connected neural network layer. Where the output of a previous reshape layer can be sent to two distinct dense layers: one layer can try to learn "what" the next transaction will be while the other layer can try to learn "when" it will take place. An output layer can compute the predictions based on the output of the previous dense layer. The sequence of the transaction vector is then fed to the network and can successively be passed through various layers. First, the input may be passed through a LSTM layer, according to the algorithm detailed in FIG. 6B—FIG. 6E. Then, the output of such layer may be reshaped into a multi-dimensional vector with different dimensions. Then, this new multi-dimensional vector may be passed through a regular fully connected dense neural network layer, according to the algorithm detailed in FIG. 2. Finally, the output of this dense layer may be passed through an output layer, which turns its input into a probability distribution.

In 812, system 100 may generate an output of the sequential layers that may include a vector of probability of purchase for each item as well as the estimated time of purchase for each item. For example, within the frame of the above example, such vector could be (75%, 62%, 2.3), where the first entry represents the probability item A is purchased during the next transaction, the second entry represents the likelihood of item B being bought, and the third entry is the time prediction regarding when the next transaction will occur. In 814, system 100 may compare the output to the actual vector of purchased items during the next transaction (e.g., which may be input and encoded as discussed above in 802-806) and compute the error between the target vector and the output 812. For example, within the frame of the above example, the prediction vector could be (75%, 62%, 2.3) and the actual transaction vector could be (1, 0, 3.4). In 816, system 100 may back propagate the discrepancy/error between output and target through the LSTM network and the weights may be optimized. For example, as explained above, each neuron in a given layer of the network may be connected to all or some neurons in the next layer. Each of these connections may be characterized by a 'weight'. The training phase may optimize those weights, for example, by finding the set of weights that minimizes the error between the prediction output and the actual target values. The back-propagation through time algorithm used in 816 may perform such optimization in some embodiments. By repeating the process 802-816 a large number of times (e.g., any large number of times, such as 2000 times), the LSTM may be trained.

Figure 9:
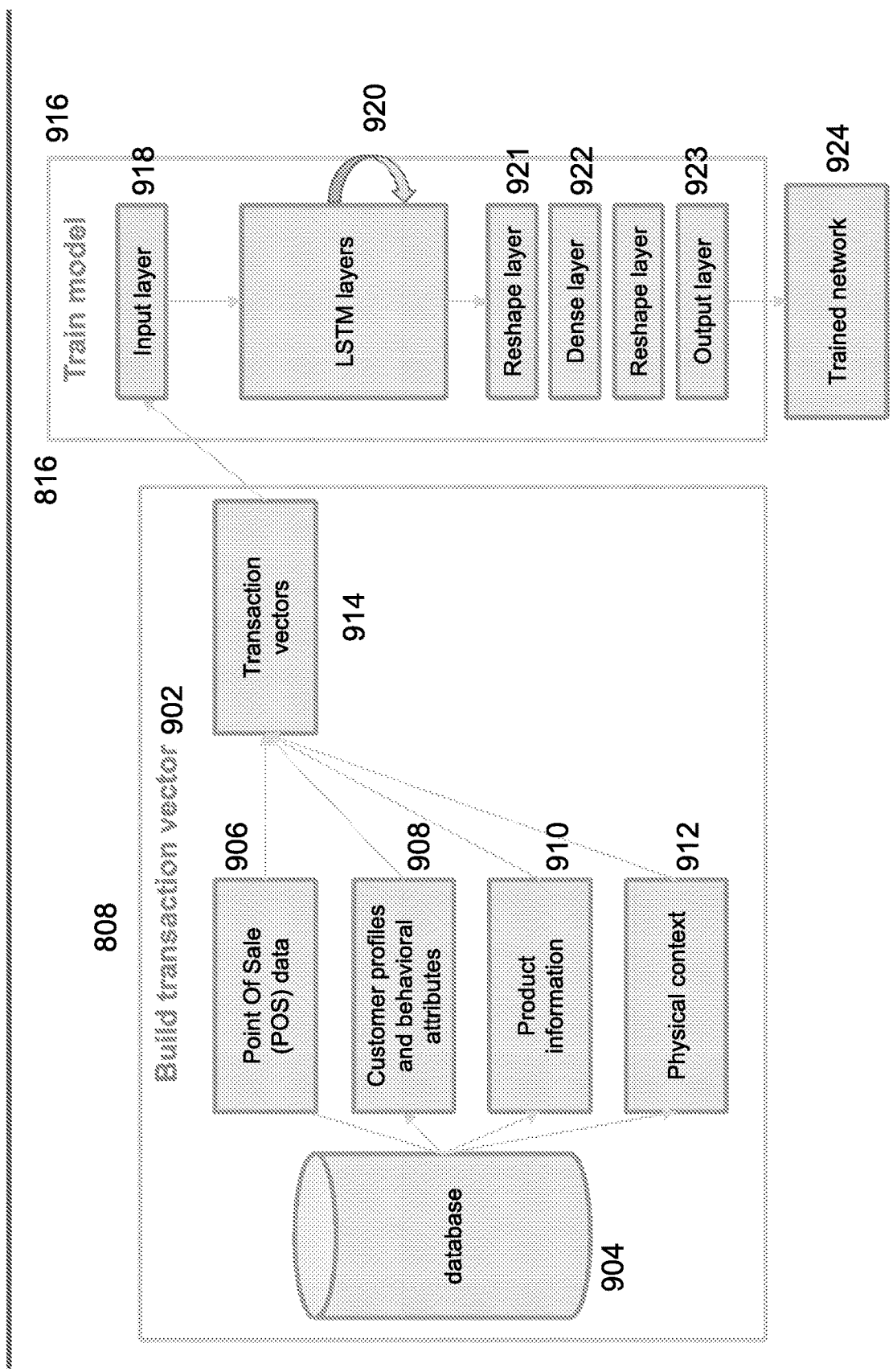
FIG. 9 is a model training process according to an embodiment of the invention.

FIG. 9 is a model training process according to an embodiment of the invention. For example, the process of FIG. 9 may be a specific implementation of the data point creation in 808 and LSTM training in 816 of FIG. 8.

System 100 may build one or more transaction vectors 902 to represent transactions. This may be done, for example, by using data from an Online Analytical Processing (OLAP) Database 904. System 100 may retrieve from database 904 one or more of the following: point of sale (POS) data (e.g., item purchased, price, time, etc.) 906, customer profiles and behavioral attributes (e.g. age, occupation, marital status) 908, product information (e.g. nutritional value, size, content, ingredients) 910, and/or physical context (e.g. hour of the day, temperature, location) 912.

From this information, system 100 may build a transaction vector 914, according to the mapping described in 802-804. For example, if there are a total of 2 items, A and B, then item A may be assigned index 0, and item B may be assigned index 1. A transaction consisting only of item A will be mapped to the vector (1,0).

Transaction vector 914 may be used to train the model 916. The input layers 918 may feed into LSTM layers 920 which may learn long or short-term dependencies out of the data (as described in FIG. 6B through 6E). Dropout layers may also be included to prevent over fitting. A dropout layer may allow certain nodes in the network to be randomly disregarded during the training process, causing the associated weights to not be updated during all training iterations. The at least one LSTM layer may feed into at least one reshape layer 921, then at least one dense layer 922, then at least one output layers 923 which may reshape the data to output the predicted transaction vectors (reshape layers allows to change the dimension of the multidimensional vector, that is output by the previous layer. Dense layers are simple fully connected neural network layers) as described in FIG. 2. The exact amount of layers may be problem-specific and may be tuned via cross-validation. For example, one may train and test a network with 2 layers, and keep track of the prediction quality of such model. He/She then may train and test another network with 4 layers, and keep track of the quality of predictions. By comparing the predictive power of both models (e.g., 2 vs 4 layers), one may know which number of layer is optimal System 110 may train the model via a Backpropagation Through Time (BPTT) algorithm to learn the parameters of the network over Graphics Processing Unit (GPU) hardware and serialize the trained model for future business use. The resulting output may be a trained network 938.

Note that additional information on the BPTT equations and algorithm can be found in the article entitled "A Focused BackPropagation Algorithm for Temporal Pattern Recognition" by MC Mozer in Complex Systems, Vol. 3, Pgs. 349-381 (1989), which is herein incorporated by reference in its entirety.

Once the network is trained, system 100 can use new transaction data and predict future transactions. The prediction quality may be assessed via measuring the discrepancy between the predicted output and the actual target. For example, once a predicted basket of future purchases has been computed, it may be compared to an actual transaction basket. System 100 may use a confusion matrix to compute the number of times a predicted item was actually purchased, a predicted item was not purchased, a non-predicted item was purchased, and/or a non-predicted item was not purchased. These numbers may allow system 100 to compute metrics such as sensitivity (also called recall, or true positive rate) and specificity (also called true negative rate). Listed below are some other example metrics that system 100 may compute.

Note that additional information on these metrics can be found in the Wikipedia article entitled "Sensitivity and Specificity" and in the article entitled "Diagnostic Tests 1: Sensitivity & Specificity" by D. G. Altman et al. in BMJ, Vol. 308, Pg. 1552 (Jun. 11, 1994), which are herein incorporated by reference in their entirety.

Precision: Percentage of predicted items that are actually purchased during the next transaction.

Cross entropy: A measure of how high the probabilities of purchase were for products that were actually purchased, and of how low the probabilities of purchase were for products that weren't actually purchased.

Predicting time until next transaction: Since the LSTM also outputs the estimated time until the next transaction occur, system 100 can assess the quality of such prediction.

Mean-squared error: Computing the square of the difference between the predicted amount of time until the next transactions and the actual time periods until next transactions.

Parameter tuning slide: Using an LSTM to predict future transactions may involve innovative parameterization, such as the following:

Number of hidden units: Number of neurons in the first hidden layer of the neural network set to ~30 in this example.

Number of learning epochs: Number of learning iterations, (e.g., the number of batches of points that will be used for training, which is set to >200 in this example).

Batch size: Number of training data points to be fed at once set to 1 in this example.

Learning rate: How much each learning iteration will modify the weights in the net set to ~0.075 in this example.

Sequence length: Number of distinct transactions to be used in a single data point set anywhere between 2 and 20 in this example.

The sequence length may tell the LSTM how far back in the past they can look to predict the next transaction. The value for the sequence length may depend on the type of customer, the average basket size, and/or the variance of the time intervals between transactions. An example heuristic is to set the sequence length s to: $s=0.56\mu_B+0.22\sigma_t$ where $\mu_B$ is the average basket size and $\sigma_t$ is the standard deviation of the time periods between transactions.

When the algorithm is well trained and tuned, the predicting power can be useful. For example, in some examples using some embodiments of the invention, the following results have been demonstrated:

More than 50% of the items that were actually purchased during the next transaction were predicted (e.g., also referred to as recall and/or sensitivity).

More than 50% of the predicted items were actually purchased during the next transaction (e.g., also referred to as precision).

More than 95% of the items that were not in the predicted basket were actually not purchased (e.g., also referred to as true negative rate and/or specificity).

The predicted time until the next transaction was close (e.g., within a few minutes, within a few hours) to the actual purchase time.

Such predictive power may provide visibility on what the customers' next short term moves will be. Useful business applications may comprise the following:

Predictive ability at the customer level.

More efficient targeted advertisement (e.g., offers, rewards, etc.).

Better dynamic pricing strategies.

Optimized inventory management.

The following example illustrates a complex classification problem that may be solved by the LSTM. Consider the following scenario:

Distinct items to potentially purchase: 70

Number of items in the true transaction basket: 6

By picking 6 items at random without replacement, what is the expected number of items that will be in the actual basket?

This experiment follows a hyper-geometric distribution and the average number of right item picks is ~0.51.

The deep learning approach consistent with the description above may yield approximately 5 right item predictions per basket (10 times more).

The LSTM tries to predict both what will be purchased next and when. Qualitatively, a customer may purchase an unusually large basket of products, giving information on what he will and will not purchase next and when he will do so (e.g., it may be safe to assume he will not be shopping for a while). Quantitatively, the training algorithm may attempt to minimize a linear combination of the cross entropy cost function from the "what" problem and the mean squared error cost function from the "when" problem. During the back propagation phase, discrepancy between the true time and the estimated time may impact the weights of the part of the neural network dedicated to solving the "what" problem (and vice-versa).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A prediction method comprising:
    storing records, in a non-transitory memory using a processor, for transactions, each record comprising an indication identifying a plurality of products involved in a transaction and an indication of a time elapsed between the transaction and a previous transaction;
    performing processing, on the processor, associated with analyzing, using a neural network comprising at least a unidirectional long short term memory (LSTM) network, the records for the transactions to produce a probability that at least one of the products will be involved in a next transaction, wherein the LSTM network utilizes one or more cell states that are updated based on the records for transactions, the updating comprising:
        applying a forget gate layer to decide what information to discard from the cell state,
        applying an input gate layer to determine what new information to store in the cell state,
        updating the cell state with one or more outcomes of the forget gate layer and the input gate layer to form an updated cell state, and
        deciding what information to output based on the updated cell state and the input from one or more current and previous transactions; and
    storing the probability for the at least one product in the non-transitory memory.

2. The prediction method of claim 1, wherein analyzing further comprises producing a time estimate value for a future time when the next transaction will occur.

3. The prediction method of claim 2, wherein the prediction indicates when the next transaction is predicted to occur and the probabilities that each product is involved in the next transaction.

4. The prediction method of claim 1, further comprising performing processing associated with mapping, with the processor, each product within the transaction to a unique index to generate a vector representation of the transaction.

5. The prediction method of claim 1, further comprising performing processing associated with training, with the processor, the LSTM network by sequentially feeding numerous transactions into the network and algorithmically optimizing weights of the LSTM.

6. The prediction method of claim 5, wherein the processing associated with training comprises learning multiple long term and short term purchasing patterns based on a dataset of past transactions.

7. The prediction method of claim 1, wherein the processing associated with analyzing further comprises using a reshape layer, a dense layer, an LSTM layer, or an output layer, or a combination thereof.

8. The prediction method of claim 1, wherein using the LSTM network comprises performing processing associated with predicting a future event based on at least one prior context.

9. The prediction method of claim 8, wherein using the LSTM network comprises performing processing associated with identifying and discarding an information subset, derived from past transaction data, to be discarded when making a next prediction.

10. The prediction method of claim 8, wherein using the LSTM network comprises performing processing associated with identifying and retaining an information subset, derived from past transaction data, to be retained when making a next prediction.

11. The prediction method of claim 8, wherein using the LSTM network comprises performing processing associated with updating a current state or the at least one prior context based on an information subset that was discarded and/or based on an information subset that was retained.

12. The prediction method of claim 8, wherein using the LSTM network comprises performing processing associated with selecting the probability from among a plurality of possible outcomes.

13. The prediction method of claim 1, wherein each record represents a single transaction within the LSTM network.

14. The prediction method of claim 1, further comprising performing processing associated with encoding and sequentially feeding to the LSTM network, with the processor, transaction records to train the LSTM network.

15. The prediction method of claim 1, wherein the LSTM further comprises a forget layer comprising a sigmoid layer.

\* \* \* \* \*